United States Patent
Yoshida et al.

(10) Patent No.: US 7,263,904 B2
(45) Date of Patent: Sep. 4, 2007

(54) TORQUE-DETECTING DEVICE

(75) Inventors: Kazuhiko Yoshida, Shizuoka (JP);
Takashi Koike, Shizuoka (JP); Kenichi Iwamoto, Shizuoka (JP)

(73) Assignee: NTN Corporation, Osaka-shi, Osaka (JP)

( * ) Notice: Subject to any disclaimer, the term of this patent is extended or adjusted under 35 U.S.C. 154(b) by 113 days.

(21) Appl. No.: 10/556,572

(22) PCT Filed: May 10, 2004

(86) PCT No.: PCT/JP2004/006242

§ 371 (c)(1),
(2), (4) Date: Nov. 14, 2005

(87) PCT Pub. No.: WO2004/102146

PCT Pub. Date: Nov. 25, 2004

(65) Prior Publication Data

US 2007/0022809 A1 Feb. 1, 2007

(30) Foreign Application Priority Data

May 16, 2003 (JP) ............................. 2003-138519

(51) Int. Cl.
*G01L 3/00* (2006.01)
(52) U.S. Cl. ................................. 73/862.331
(58) Field of Classification Search ...........................
73/862.331–862.336; 384/448
See application file for complete search history.

(56) References Cited

U.S. PATENT DOCUMENTS 5,107,711 A * 4/1992 Aoki et al. ............ 73/862.333
5,280,729 A * 1/1994 Aoki et al. ............ 73/862.333
5,585,574 A * 12/1996 Sugihara et al. ....... 73/862.334

(Continued)

FOREIGN PATENT DOCUMENTS

JP 5-93661 4/1993

(Continued)

OTHER PUBLICATIONS

International Search Report for PCT/JP2004/006242, dated Aug. 24, 2004 (1 page).

(Continued)

*Primary Examiner*—Michael Cygan
*Assistant Examiner*—Octavia Davis
(74) *Attorney, Agent, or Firm*—Osha Liang LLP

(57) ABSTRACT

To provide a torque detecting device having a sufficient mechanical strength, capable of accomplishing an accurate torque measurement, having a processability excellent for mass-production, and effective to eliminate problems associated with damages which would be brought about during a heat treatment. This torque detecting device includes a target area subject to torque detection (3) provided in a surface region of a torque transmitting shaft (2) made of a steel material; a detecting coil (4) provided in a non-contact fashion in face-to-face relation to an outer periphery of the target area subject to torque detection (3); and a detection signal processing circuit (5). The target area subject to torque detection (3) is a layer of magnetostrictive material comprised of an Al diffusion layer. This diffusion layer contains Al diffused in a steel material in a concentration which gradually decreases from the surface in a direction radially inwardly of the torque transmitting shaft (2).

16 Claims, 5 Drawing Sheets

U.S. PATENT DOCUMENTS

| | | | |
|---|---|---|---|
| 6,260,423 B1 * | 7/2001 | Garshelis | 73/862.336 |
| 6,574,853 B2 * | 6/2003 | Shinoura | 29/602.1 |
| 6,828,041 B2 * | 12/2004 | Ueda et al. | 428/660 |
| 7,158,223 B2 * | 1/2007 | Arai | 356/218 |
| 2006/0153482 A1 * | 7/2006 | Koike et al. | 384/448 |

FOREIGN PATENT DOCUMENTS

| | | |
|---|---|---|
| JP | 5-203506 | 8/1993 |
| JP | 8-15060 | 1/1996 |
| JP | 2592491 | 12/1996 |
| JP | 2765340 | 4/1998 |

OTHER PUBLICATIONS

Patent Abstracts of Japan 05-203506 dated Aug. 10, 1993 (2 pages).
Patent Abstracts of Japan 08-015060 dated Jan. 19, 1996 (1 page).
Patent Abstracts of Japan 05-093661 dated Apr. 16, 1993 (2 pages).
Patent Abstracts of Japan 01-247530 dated Oct. 3, 1989 (2 pages) (related to BD above).
Patent Abstracts of Japan 05-072064 dated Mar. 23, 1993 (2 pages) (relates to BE above).

* cited by examiner

TORQUE-DETECTING DEVICE

This application is a 371 of PCT/JP04/06242.

FIELD OF THE INVENTION

The present invention relates to a torque detecting device for detecting a loaded torque in a non-contact fashion by detecting a magnetostrictive phenomenon appearing in a surface layer of a shaft when the torque is loaded on such shaft.

BACKGROUND ART

In a non-contact magnetostrictive torque detecting device, when a to-be-measured shaft is manufactured using steel for machine structural use, the magnetostrictive phenomenon does not occur so conspicuously that an accurate detection of the torque is difficult to achieve. Accordingly, the torque detecting device has been suggested, in which a special alloy, for example, an Fe—Al alloy is used for the to-be-measured shaft. See, for example, the Japanese Patent No. 2592491. However, since the Fe—Al alloy is hard, but fragile, the mechanical processability is reduced considerably. In a case of a to-be-measured shaft having notches, the torsional fatigue strength and the impact value are also reduced significantly. For this reason, application of this alloy as a material for a structural component has been difficult to achieve.

As an alternative measure, attempts have been made to manufacture a shaft with the use of the Fe—Al alloy only on a surface region of a to-be-detected portion of the to-be-measured shaft while steel for machinery structural use is jointed to a portion of the shaft where strength and toughness are required. In such case, the jointed portion lacks a reliability and is costly to make. For this reason, various shafts have been suggested, in which the Fe—Al alloy is welded to a necessary portion of a surface region of the to-be-measured shaft, but all of them involve the following problems.

By way of example, where a high magnetostrictive material such as an Fe—Al alloy is overlaid on a surface region of the to-be-measured shaft made of steel for machine structural use, which is a to-be-detected portion of the to-be-measured shaft, by the use of an overlay welding technique so that such to-be-detected portion can be used as a target area subject to torque detection such as disclosed in the Japanese Patent No. 2765340, a problem has been encountered with that since the Fe—Al alloy is fragile, cracking and/or exfoliation tend to occur during the overlay welding. In an attempt to eliminate such problem and particularly to avoid the cracking, it has been suggested to effect the overlay welding to form the overlaid Fe—Al alloy layer of a thickness equal to or smaller than 3 mm. However, since when the overlay welding or spray coating (such as employed in the Japanese Patent No. 2765340) is effected, pores tend to occur, which constitute a cause of premature cracking brought about by a cyclically loaded torque and also that of deviation in magnetostrictive characteristic. This deviation in magnetostrictive characteristic will in turn leads to considerable reduction in detecting accuracy.

DISCLOSURE OF THE INVENTION

The present invention is intended to provide an improved torque detecting device capable of accomplishing an accurate torque measurement, having sufficient mechanical strength and a processability excellent for mass-production, and effective to eliminate problems associated with damages which would be brought about during a heat treatment.

In order to accomplish the foregoing object, the torque detecting device according to the present invention includes a target area subject to torque detection provided in a surface region of a torque transmitting shaft made of a steel material; a detecting coil provided in a non-contact fashion in face-to-face relation to an outer periphery of the target area subject to torque detection; and a detection signal processing circuit, electrically coupled with the detecting coil, for detecting a change in magnetic permeability of the target area subject to torque detection to thereby detect a torque. The target area subject to torque detection is constituted by an Al diffusion layer containing Al in a concentration gradually decreasing from a surface of the torque transmitting shaft in a direction radially inwardly of the latter.

According to this construction, since the Al is diffused in the steel material in such a manner that the concentration of Al in the resultant diffusion layer may exhibit a gradient, without decrease of the mechanical strength of the torque transmitting shaft, the target area subject to torque detection represented by the diffusion layer of a magnetostrictive material having a high magnetostrictive characteristic can be obtained to enable an accurate measurement of the torque to be achieved. The diffusion layer having such a gradient concentration is formed in a homogeneous alloy layer without pores such as found with an overlay spray coating and accordingly, the occurrence of an early cracking resulting from fatigue can be suppressed considerably. Also, no cracking occurs even during the heat treatment. Since the diffusion of Al can be carried out subsequent to completion of a mechanical processing applied to the torque transmitting shaft, the diffusion layer referred to above can have an excellent processability suited for mass-production as is the case with the standard steel material and the productivity can increase, resulting in reduction of the cost.

The Al diffusion layer may have a concentration of Al at a surface thereof, which is preferably within the range of 5 to 25 wt %, and also have a depth of diffusion exceeding 0.1 mm.

If the diffused Al concentration on the surface is lower than 5 wt %, the magnetostrictive characteristic tends to be lowered, and if it exceeds 25 wt %, the magnetostrictive characteristic tends to be lowered or saturated. For this reason, selection of the diffused Al concentration within the range of 5 to 25 wt % is effective to provide an excellent magnetostrictive characteristic. Also, since the grinding allowance is generally about 0.1 mm, if the depth of penetration of the Al diffusion layer exceeds 0.1 mm, the Al diffusion layer can remain on the surface even though the grinding is performed in a usual manner and, hence, the magnetostrictive characteristic can be secured even after the grinding.

In the present invention, a steel material having a matrix of a composition containing 0.15 to 0.6 wt % of C (carbon); 0.1 to 1.0 wt % of one or two or more elements selected from the group consisting of Si (silicon), Mn (manganese), Cr (chromium), Mo (molybdenum) and Ni (nickel); and not greater than 0.02 wt % of S (sulfur) and P (phosphorus) may be used for the torque transmitting shaft.

In terms of the mechanical processability and the hardness after quenching, if the amount of carbon contained in the steel material is smaller than the lower limit of 0.15 wt %, the hardness after quenching tends to be lowered, failing to attain a required hardness. On the other hand, if the content of carbon exceeds the upper limit of 0.6 wt %, the processability and the toughness will decrease. Accordingly, the amount of carbon contained in the steel material is chosen to be within the range of 0.15 to 0.6 wt % as quoted above, so that not only can a sufficient quench hardness be obtained, but also the processability and toughness can be secured. One or two or more elements selected from the group consisting of Si, Mn, Cr, Mo and Ni are preferably added to the steel material for the purpose of securing the hardenability. In such case, if the amount of such one or two or more elements contained in the steel material is smaller than the lower limit of 0.1 wt %, no sufficient hardenability can be obtained, and if it exceeds the upper limit of 1.0 wt %, the processability will decrease considerably. For this reason, the amount of such one or two or more elements contained in the steel material is chosen to be within the range of 0.1 to 1.0 wt % as quoted above, so that a sufficient hardenability can be secured. Also, the content of S and P, when chosen to be not greater than 0.02 wt %, is effective to avoid an undesirable reduction of the toughness of the diffusion layer and that of the matrix.

In the present invention, the matrix of the torque transmitting shaft may be a steel material containing 0.01 to 0.15 wt % of Al, and 0.01 to 0.25 wt % of one or two or more elements selected from the group consisting of Nb (niobium), V (vanadium), Ti (titanium) and Zr (zirconium).

The diffusion of Al is processed at an elevated temperature and, therefore, the crystal grain of the steel material tends to become coarse. In order to suppress the coarse crystal grain, one or two or more substances selected from the group of Nb, V, Ti and Zr are added. While during the manufacture of the steel material Al is necessarily employed as a deoxidizer in a quantity not smaller than 0.01 wt %, addition of Al in a quantity greater than 0.15 wt % will result in Al forming an impurity in the steel material, which leads to reduction of the strength. While Nb, V, Ti and/or Zr are employed in a quantity of 0.01 wt %, which is required for refinement, but the use thereof in a quantity exceeding 0.25 wt % will result in an increase of the hardness of the steel material and a considerable reduction of the processability. Addition of the elements effective to avoid the coarse crystal grain is effective to eliminate the need of normalization to be performed after the Al diffusion.

In the present invention, the torque transmitting shaft may have grooves defined in the target area subject to torque detection and the diffusion layer is formed subsequent to formation of the grooves.

For the purpose of increasing the detecting characteristic and coupling with any other component part, it is quite often that the target area subject to torque detection of the torque transmitting shaft is formed with grooves. Although the Al diffusion layer may be grooved subsequent to the diffusion since the it has an excellent processability, a performance of the diffusion after completion of the formation of the grooves as described above is effective to increase the processability considerably.

In the present invention, the torque transmitting shaft may include axially extending and circumferentially regularly arranged indentations for connection with any other component part and for transmitting the torque to the component part, the indentations being formed in the Al diffusion layer. The indentations referred to above may be in the form of serrations.

Since the Al diffusion layer has an excellent processability, the indentations such as, for example, serrations can easily be formed. The provision of such indentation gives rise to an increased coupling accuracy and, therefore, a high torque can be loaded without being accompanied by rattling motions. Also, since the Al diffusion layer has an excellent weldability, welding, frictional joining, or friction stir welding can also be easily accomplished.

In the present invention, the torque transmitting shaft may be hardened and tempered after diffusion of Al.

The hardening and tempering treatment is effective to increase the hardness of at least an area adjacent the boundary of the diffusion layer to a value higher than the hardness of the raw material. Even though the hardening and tempering treatment is carried out, the magnetostrictive characteristic of the diffusion layer can be secured. Since the hardening and tempering treatment followed by the diffusion of Al leads to reduction of the hardness, the hardening and tempering treatment is carried out after the diffusion of Al. The site processed after the diffusion of Al from which the resultant Al diffusion layer is removed may be carburized to increase the mechanical characteristics.

In the present invention, the torque transmitting shaft may be processed to have a residue stress in an outermost surface portion thereof, as a compressive stress, by means of hardened steel cutting, grinding or shot peening that is performed after the diffusion of Al. It is to be noted that the cutting of the hardened steel is intended to mean a mere cutting, and since the cutting is generally carried out subject to a raw material, the term "hardened steel cutting" has been used to clarify that the cutting is performed after the hardening.

If the hardening treatment is carried out, the diffusion layer is so susceptible to the residue tensile stress that as long as it is left as it stands the fatigue strength will decrease. If the hardened steel cutting, grinding or shot peening is carried out to the surface of the diffusion layer as described above, the outermost surface area of the Al diffusion layer can be imparted a residue compressive stress and, accordingly, the fatigue strength of the diffusion layer can increase advantageously.

In the present invention, nitrogen may be diffused in the Al diffusion layer.

If nitrogen is diffused, the hardness of the Al diffusion layer can be increased and, hence, the strength of the Al diffusion layer can also be increased.

In the present invention, the torque transmitting shaft provided with the target area subject to torque detection may be a shaft member of a constant velocity ball joint.

The constant velocity ball joint is a joint operable to transmit the torque and, therefore, if the diffusion layer is provided on the shaft member of the constant velocity ball joint, the torque acting on the shaft member can be measured. Where this structure is applied to the constant velocity ball joint for use in driving a vehicle wheel, a fine and precise control of the automotive vehicle and an engine can be accomplished. On the other hand, where this structure is applied to the constant velocity ball joint used in the power steering system, the steering characteristic can be increased through the detection of the torque with high precision.

The torque transmitting shaft may be formed with a plurality of grooves inclined relative to a longitudinal axis thereof and deployed in a direction circumferentially thereof, in which case the target area subject to torque detection comprised of the Al diffusion layer is provided within an axial range of the torque transmitting shaft, where the grooves are provided.

Since the torsional strain generated by the torque acting on the torque transmitting shaft lies in a diagonal direction, the provision of the circumferential row of the inclined groove in the diffusion layer is effective to allow the strain resulting from the torque to be considerably generated with the detecting sensitivity increased consequently.

In the present invention, the Al diffusion layer may include a plurality of diffusion layer formed islands that are inclined relative to a longitudinal axis of the torque transmitting shaft and deployed in a direction circumferentially thereof, and an axial range of the torque transmitting shaft, where the diffusion layer formed islands are provided, may define the target area subject to torque detection.

Even where the pattern of the diffusion layer formed islands that are inclined relative to the longitudinal axis of the torque transmitting shaft is formed on the torque transmitting shaft, generation of strains can be enhanced to such an extent as to result in increase of the detecting sensitivity.

Where the target area subject to torque detection is formed by the grooves inclined relative to the longitudinal axis and deployed in the circumferential direction or the diffusion layer formed islands inclined relative to the longitudinal axis, the torque transmitting shaft referred to above may be a shaft portion of a constant velocity ball joint.

In the case of this construction, the torque of the drive shaft such as used in an automotive vehicle can be detected with high precision and, therefore, a fine and precise control of the automotive vehicle and an engine can be accomplished.

Also, where the inclined grooves or the diffusion layer formed islands are employed, the torque transmitting referred to above may be a raceway member of a rolling bearing assembly.

In the case of this construction, a compact rolling bearing assembly having a torque detecting capability can be obtained.

BEST MODE FOR CARRYING OUT THE INVENTION

Figure 1:
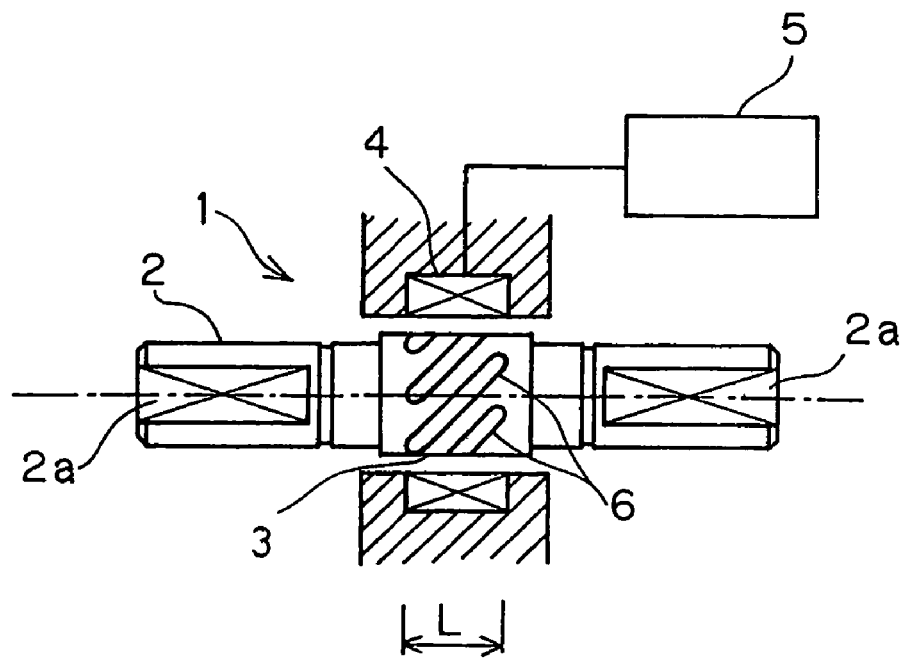
FIG. 1 is a schematic diagram showing the structure of a torque detecting device according to a first preferred embodiment of the present invention.

A first preferred embodiment of the present invention will now be described with particular reference to FIG. 1. FIG. 1 is a schematic diagram showing a general structure of a torque detecting device according to this embodiment. This torque detecting device 1 is of a magnetostrictive system and includes a target area subject to torque detection 3 provided on a surface region of a torque transmitting shaft 2 made of a steel material, the detecting coil 4 disposed in a non-contact fashion relative to and positioned radially outwardly of the target area subject to torque detection 3, and a detection signal processing means 5 electrically connected with the detecting coil 4 for detecting the torque in terms of change in magnetic permeability of the target area subject to torque detection 3. For the steel material forming a matrix of the torque transmitting shaft 2, steel for machinery structural use, for example, may be employed.

The target area subject to torque detection 3 is in the form of a diffusion layer in which aluminum (Al) is diffused in the steel material, that is the matrix, so that the concentration of Al may gradually decrease from a surface of the torque transmitting shaft 2 in a direction radially inwardly of the torque transmitting shaft 2. This diffusion layer forms a magnetostrictive layer. This diffusion treatment to form the diffusion layer is carried out by tightly enclosing the matrix of the torque transmitting shaft 2, that is a to-be-processed material, within a vessel together with a powdery alloy of Fe—Al and various formulated agents and then heating it.

The diffusion layer may be provided in an axial portion of the torque transmitting shaft 2 with respect to the axial direction thereof. However, in the illustrated embodiment, for the purpose of streamlining the diffusion process, the diffusion layer is provided on an entire surface of the torque transmitting shaft 2, and an axial portion of the layer is used as a target area subject to torque detection 3. In a region L of the torque transmitting shaft 2 in the axial direction thereof, where the target area subject to torque detection 3 is defined, a plurality of grooves 6 inclined relative to the longitudinal axis of the torque transmitting shaft 2 are formed spaced circumferentially equidistantly from each other. Each of the grooves 6 is inclined at, for example, 45° relative to the longitudinal axis of the torque transmitting shaft 2.

The torque transmitting shaft 2 has one end formed with a coupling recess 2a, which may be in the form of a groove or a cutout, for connection with another shaft. Although the diffusion process to form the diffusion layer is preferably carried out after the coupling recess 2a and the inclined grooves 6 are formed in the torque transmitting shaft 2, it may be carried out prior to the formation of the coupling recess 2a and the inclined grooves 6 in the torque transmitting shaft 2. Where the diffusion process is carried out after the formation of the coupling recess 2a and the inclined grooves 6 in the torque transmitting shaft 2, the inclined grooves 6 can have their internal surfaces formed with a diffusion layer.

Effects of the above described construction and a specific example of the materials used will now be described. It is generally well known that the Fe—Al alloy exhibits a high magnetostrictive characteristic. However, since the Fe—Al alloy has a fragile characteristic, the Fe—Al alloy lacks a reliability as a machinery structural material so long as the standard manner of use of the Fe—Al alloy is concerned. Accordingly, in the illustrated embodiment, the structural steel material is diffused with Al in such a manner that the concentration of Al diffused may gradually dilute at a certain gradient and, therefore, the target area subject to torque detection 3 having the diffusion layer of magnetostrictive material with a high magnetostrictive characteristic could have been obtained without the mechanical strength of the torque transmitting shaft 2 being lowered. When in order for Al to be distributed from the surface with its concentration gradually diluted at a certain gradient, Al is allowed to diffuse from the surface under a high temperature atmosphere, a layer containing Al in a gradually diluting concentration exhibiting a gentle curve from the surface towards the longitudinal axis of the torque transmitting shaft 2 could be formed in the steel material which is a matrix of the torque transmitting shaft 2. The diffusion layer having the gradually diluting concentration of Al is formed as a homogenous alloy layer without being accompanied by pores such as occurring upon overlay welding and, therefore, the occurrence of premature cracking resulting from fatigue can be considerably suppressed. Also, even during the heat treatment, no cracking occurs.

Also, where it is a magnetostrictive material prepared from a bulk material of the Fe—Al alloy, the processability will be lowered because of its fragile nature, but according to the above described diffusion process, when the Al diffusion is carried out after a mechanical processing of the torque transmitting shaft 2, it will have the same processability as that of the standard steel material, accompanied by increase of the productivity. For this reason, a low cost can be achieved. Also, since the Al diffusion layer has a good processability, processing of the inclined grooves 6 and the coupling indentations 2a may be carried out after the diffusion. The grooves 6 of the target area subject to torque detection 3 contribute to increase of the magnetostrictive characteristic of the target are subject to torque detection 3, which in turn increase the detecting sensitivity.

The concentration of Al diffused in the surface of the target area subject to torque detection 3 is preferably within the range of 5 to 25 wt %. If the diffused Al concentration is lower than 5 wt %, the magnetostrictive characteristic tends to be lowered, and if it exceeds 25 wt %, the magnetostrictive characteristic tends to be lowered or saturated. On the other hand, the depth of penetration of Al so diffused is required to be greater than the grinding allowance (0.1 mm). Also, since the standard torque detecting device of the magnetostrictive system is oscillated at a frequency of about 30 KHz, the magnetic fluxes flow only in a skin depth range of an outermost surface layer (layer of about 200 µm in depth) by the skin effect. Accordingly, the depth of Al diffusion can be considered sufficient if it exceeds the skin depth range and, more particularly, 0.8 mm is sufficient for the depth of Al diffusion and more depth appears good for nothing. Accordingly, the depth of Al diffusion in the target area subject to torque detection 3 is preferably in excess of 0.1 mm and more preferably within the range of 0.15 to 0.8 mm.

The steel material for the torque transmitting shaft 2 has the following matrix composition containing 0.15 to 0.6 wt % of C; 0.1 to 1.0 wt % of one or two or more elements selected from the group consisting of Si, Mn, Cr, Mo and Ni; and not greater than 0.02 wt % of S and P.

In terms of the mechanical processability and the hardness after quenching, if the amount of carbon contained in the steel material is smaller than the lower limit of 0.15 wt %, the hardness after quenching tends to be lowered, failing to attain a required hardness. On the other hand, if the content of carbon exceeds the upper limit of 0.6 wt %, the processability and the toughness will decrease. Accordingly, the amount of carbon contained in the steel material is chosen to be within the range of 0.15 to 0.6 wt % as quoted above.

One or two or more elements selected from the group consisting of Si, Mn, Cr, Mo and Ni are added to the steel material for the purpose of securing the hardenability. If the amount of such one or two or more elements contained in the steel material is smaller than the lower limit of 0.1 wt %, no sufficient hardenability can be obtained, and if it exceeds the upper limit of 1.0 wt %, the processability will decrease considerably. For this reason, the amount of such one or two or more elements contained in the steel material is chosen to be within the range of 0.1 to 1.0 wt % as quoted above.

Also, the amount of sulfur and phosphorus is chosen to be not greater than 0.02 wt % so that the toughness of each of the diffused portion and the matrix portion will not be lowered.

The torque transmitting shaft 2 may be in the form of either a rod or a pipe. Where the torque transmitting shaft 2 is in the form of a pipe, the pipe may be either a seamless pipe or an electric resistance welded tube.

The diffusion of Al is processed at an elevated temperature and, therefore, the crystal grain of the steel material tends to become coarse. In order to suppress the coarse crystal grain, Al is added and, also, one or two or more substances selected from the group of Nb, V, Ti and Zr are added. While during the manufacture of the steel material Al is necessarily employed as a deoxidizer in a quantity not smaller than 0.01 wt %, addition of Al in a quantity greater than 0.15 wt % will result in Al forming an impurity in the steel material, which leads to reduction of the strength. For this reason, the amount of Al contained in the steel material is chosen to be within the range of 0.01 to 0.15 wt %. While Nb, V, Ti and/or Zr are employed in a quantity of 0.01 wt %, which is required for refinement, but the use thereof in a quantity exceeding 0.25 wt % will result in an increase of the hardness of the steel material and a considerable reduction of the processability. Accordingly, one or two substances selected from the group of Nb, V, Ti and Zr are each employed in the steel material in a quantity within the range within the range of 0.01 to 0.25 wt %. Refinement is effective to eliminate the need of normalization to be performed after the Al diffusion.

The Al diffusion to form the target area subject to torque detection 3 is performed subsequent to completion of the formation of the grooves 6 in the target area subject to torque detection 3. In this way, the processability can increase considerably.

For the purpose of increasing the strength, the torque transmitting shaft 2 is, after the Al diffusion, hardened and tempered, so that the hardness of at least the diffusion layer and an area adjacent the boundary of the diffusion layer can be increased to a value higher than the hardness of the raw material. For the hardening of the torque transmitting shaft 2, an induction hardening process is employed and the hardness after this hardening treatment is preferably within the range of Hv 300 to 700. In such case, the Al diffusion layer, which is the target area subject to torque detection 3, is not hardened.

When hardened in the manner described above, the Al diffusion layer, which is the target area subject to torque detection 3, is susceptible to residue tensile stresses and, accordingly, in the embodiment now under discussion, a hardened steel cutting, a grinding or a shot peening is applied to the surface of the Al diffusion layer after the hardening treatment. By this treatment, a residue compressive stress can be imparted to the outermost surface region of the Al diffusion layer, resulting in increase of the fatigue strength of the target area subject to torque detection 3 represented by the Al diffusion layer. Also, in order to increase the hardness, nitrogen may be diffused in the Al diffusion layer. When the nitrogen is so diffused, the strength of the Al diffusion layer can be increased. After the Al diffusion, it may be mechanically processed, and a portion where the diffusion layer is removed may be carburized to increase the mechanical characteristic.

Summarizing the foregoing, the torque detecting device 1 according to the foregoing embodiment can give rise to the following advantages. More specifically, since the target area subject to torque detection 3 provided in the surface region of the torque transmitting shaft 2 is provided with the magnetostrictive characteristic as the diffusion layer in which the concentration of Al contained therein gradually decreases from the surface of the torque transmitting shaft 2 in a direction radially inwardly of the latter, the following advantages can be obtained with respect to the torque transmitting shaft 2.
(1) The torque transmitting shaft 2 can have a sufficient mechanical strength.
(2) The detecting sensitivity is high and an accurate measurement of the torque can be accomplished.
(3) The processability nearly similar to that of the steel material for the machinery structural use can be obtained and the manufacturing cost can therefore be reduced.
(4) A commercially available steel material can be employed with no need to manufacture a special alloy and, therefore, the cost for the raw material can be reduced.
(5) The resistance to corrosion, the resistance to high temperature oxidizing and the resistance to frictional wear can be increased.
(6) Form rolling can be employed as a process for forming the grooves 6 and, therefore, the manufacturing cost can further be reduced.
(7) No quench crack occurs during the heat treatment.
(8) Neither joining nor spray coating is required.
(9) The homogeneous structure can be obtained.
(10) The coupling characteristic with any other component parts increases, a high torque transmission is possible and any undesirable rattling motion can be eliminated.

In the following description, a series of experiments conducted will be discussed. Those experiments were conducted on the product according to the embodiment of the present invention, shown by (3) in Table 1, and comparative products shown by (1) and (2) in Table 1. In Table 1, naming of materials listed is based on that stipulated in the Japanese Industrial Standards (JIS).

(Material Composition)
Comp. Example (1): Special steel for structural use. (nickel-chromium-molybdenum steel (SNCM439))
Comp. Example (2): Fe—Al bulk (Comparative Example).
Embodiment (3): Carbon steel for machinery structural use (S45C) with Al diffused.

Different chemical compositions of the materials and different processing systems are employed for those comparative examples (1) and (2) and the embodiment (3). Specific chemical compositions are shown in Table 1.

TABLE 1

| | Chemical Composition (wt %) | | | | | | | | | Presence of Joining |
|---|---|---|---|---|---|---|---|---|---|---|
| | C | Si | Mn | P | S | Ni | Cr | Mo | Al | |
| (1) SNCM439 | 0.41 | 0.20 | 0.51 | 0.015 | 0.016 | 1.70 | 0.81 | 0.22 | 0.016 | none |
| (2) Fe—Al Bulk | 0.004 | 0.03 | — | 0.002 | 0.01 | — | — | — | 13.5 | Frictional Joint |
| (3) S45C with Al Diffused | 0.39 | 0.19 | 0.67 | 0.019 | 0.016 | 0.08 | 0.15 | 0.02 | 0.015 | none |

(Processing System)
Each of the materials is processed as follows:
(1) SNCM439: Mechanical processing→Groove forming→Induction heating→Grinding.
(2) Fe—Al Bulk: Mechanical processing→Groove forming→Jointing→Induction heating→Grinding.
(3) S45C with Al Diffusion: Mechanical processing→Groove forming→Al Diffusion→Induction heating→Grinding (Shape)
The respective torque transmitting shafts 2 according to comparative examples (1) and (2) and the embodiment (3) all have such a shape as shown in FIG. 1.

(Al Diffusion)
The Al diffusion process referred to in the foregoing processing system was carried out in the following manner. The S45C steel material for machinery structural use was embedded in a casing made of steel together with a formulated agent, consisting of a powdery alloy of Fe—Al and a $NH_4Cl$ powder, and a buffer consisting of an $Al_2O_3$ powder, which casing was subsequently tightly closed and uniformly heated at 950° C. for 28 hours to effect diffusion of Al. The principle of this diffusion can be expressed by the following chemical formulas:

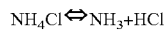

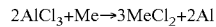

That is to say, Al contained in the powdery alloy of Fe—Al reacts with HCl to produce $AlCl_3$ (vapor), which is diffused after having been subsequently substituted with Fe metal (Me), contained in the S45C steel, on the surface of S45C.

The concentration of Al on the surface can be adjusted by adjusting the concentration of Al contained in the Fe—Al powder. It can also be adjusted by adjusting the temperature and length of time employed for the diffusion.

The Al diffusion layer so formed was found to have such a characteristic that the concentration of Al in a surface region was 16% and the depth of penetration of the diffused Al was 0.25 mm, and the hardness of the surface layer was Hv 315.

(Test Results)

Results of the tests conducted on the comparative examples (1) and (2) and the embodiment (3) are shown in Table 2. Table 2 makes it clear that the embodiment (3) and the comparative example (2) have shown about the same function with respect to sensitivity and hysteresis, but that while the comparative example (2) has shown the presence of quench cracks in the grooves, the embodiment (3) has shown no quench crack occurring therein and is thus excellent in respect of both the magnetic characteristic and the presence or absence of quench cracks. Table 2 also makes it clear that with respect to the torsional strength, the embodiment (3) has shown it to be about equal to that exhibited by a product which was subjected to the standard mechanical processing and the standard induction heat treatment (such as the comparative example (1)).

TABLE 2

| | Sensitivity | Hysteresis | Torsional Strength | Quench Crack in Grooves |
|---|---|---|---|---|
| (1) SNCM439 | 1 (Standard) | 1 (Standard) | 1 (Standard) | not found |
| (2) Fe—Al Bulk | 11.6 | 2.70 | 0.5 | found |
| (3) S45C with Al Diffused | 9.7 | 2.75 | 1 | not found |

Sensitivity and Hysterisis Measurement Conditions: Under 50 Nm Loaded

Figure 2:
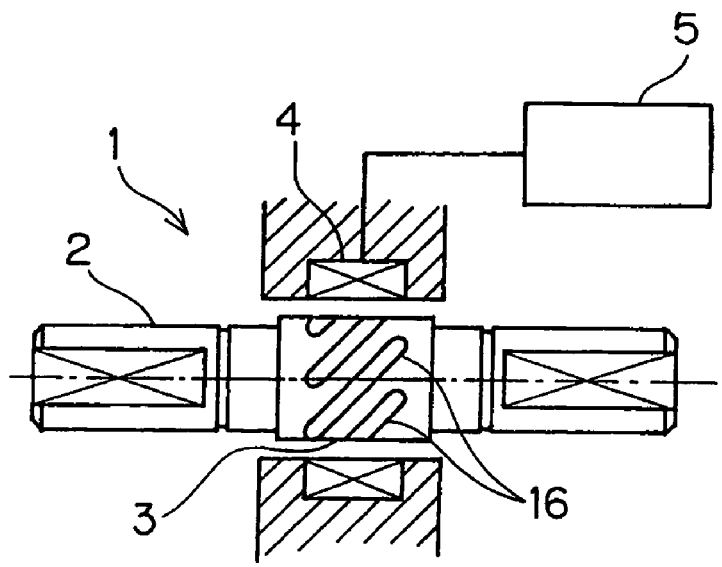
FIG. 2 is a schematic diagram showing the structure of a torque detecting device according to a second preferred embodiment of the present invention.

FIG. 2 illustrates a second preferred embodiment of the present invention. The torque detecting device 1 shown therein is substantially similar to that shown and described in connection with the first embodiment, except that in this embodiment, in place of the Al diffusion layer and the inclined grooves 6 both employed in the first embodiment, a pattern of a plurality of diffusion layer formed islands 16 that are inclined relative to the longitudinal axis of the torque transmitting shaft and equidistantly spaced from each other in a circumferential direction of the latter is provided on the torque transmitting shaft 2. An axial portion of the torque transmitting shaft 2, where the pattern of the diffusion layer formed islands 16 is located, is rendered to be the target area subject to torque detection 3. Formation of the diffusion layer formed islands 16 is carried out by setting a thin band (not shown), having a plurality of grooves formed therein and angled relative to the longitudinal axis, on a surface of the matrix of the torque transmitting shaft 2, then forming an Al diffusion layer in a manner similar to that in the previously described first embodiment, and finally removing the thin band, thereby leaving islands of the Al diffused layer on the surface of the torque transmitting shaft 2, which islands form the respective diffusion layer formed islands 16.

The use of the diffusion layer formed islands 16 is effective to increase the magnetostrictive characteristic of the target area subject to torque detection 3, resulting in increase of the detecting sensitivity. Other structural features of this second embodiment are substantially similar to those in the previously described first embodiment.

Figure 3:
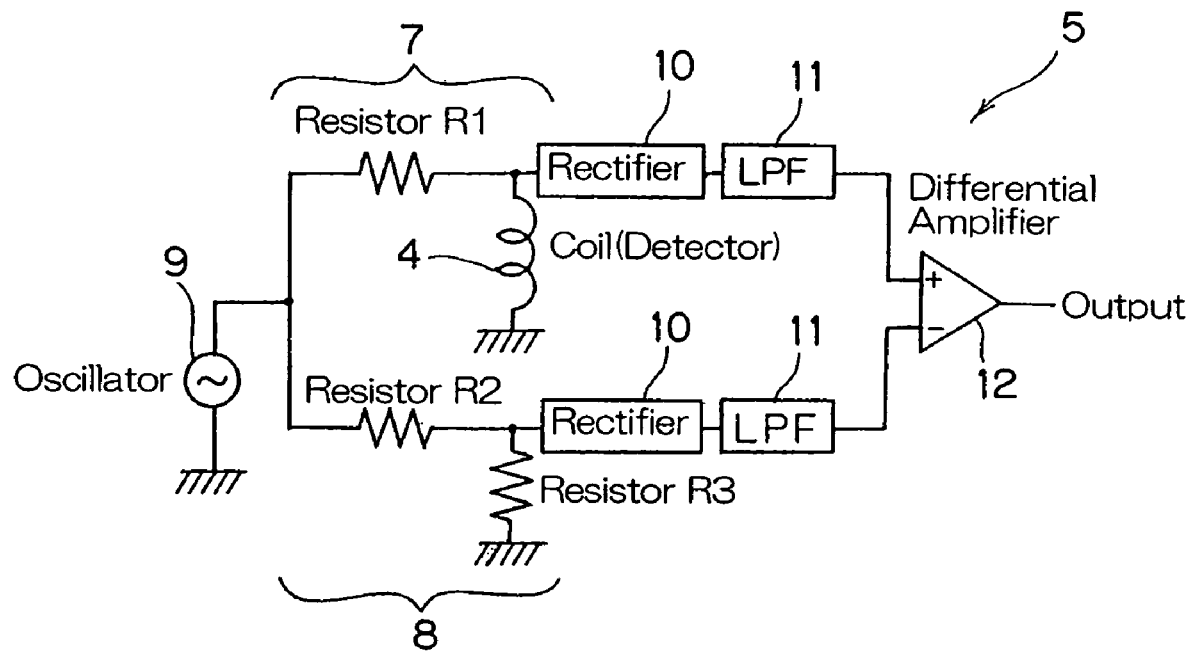
FIG. 3 is a block circuit diagram showing an electric circuit of a detection signal processing means employed in the torque detecting device shown in any one of FIGS. 1 and 2.

FIG. 3 illustrates an example of the circuit structure of a detection signal processing means 5 applicable to any one of the foregoing embodiments. The detection signal processing means 5 includes a first series connected circuit 7 made up of a resistor R1 and a detecting coil 4, a second series connected circuit 8 made up of two resistors R2 and R3 and connected parallel to the first series connected circuit 7, and an oscillator 9 for applying an alternating current voltage to both of the first and second series connected circuits 7 and 8. A divided voltage across the detecting coil 4 is converted by means of a rectifier 10 and a low pass filter 11 into a direct current voltage, which is subsequently supplied to a first input terminal of a differential amplifier 12. On the other hand, a voltage across the resistor R3 of the second series connected circuit 8 is, after having been converted into a direct current voltage by means of another rectifier 10 and another low pass filter 11, supplied to a second input terminal of the differential amplifier 12 as a reference voltage.

The differential amplifier 12 in turn outputs a signal indicative of the difference between the reference voltage from the second series connected circuit 8 and a voltage from the first series connected circuit 7, that is, the divided voltage across the detecting coil 4 having been converted into the direct current voltage by means of the rectifier 10 and the low pass filter 11. When the torque acts on the target area subject to torque detection 3, the inductance of the detecting coil 4 changes with change of the magnetic permeability of the target area subject to torque detection 3, resulting in change of the divided voltage across the detecting coil 4, and, therefore, the output from the differential amplifier 12 changes in a quantity corresponding to the amount of such change of the divided voltage across the detecting coil 4. The output from the differential amplifier 12 is an indication of change in torque acting on the torque transmitting shaft 2.

Figure 4:
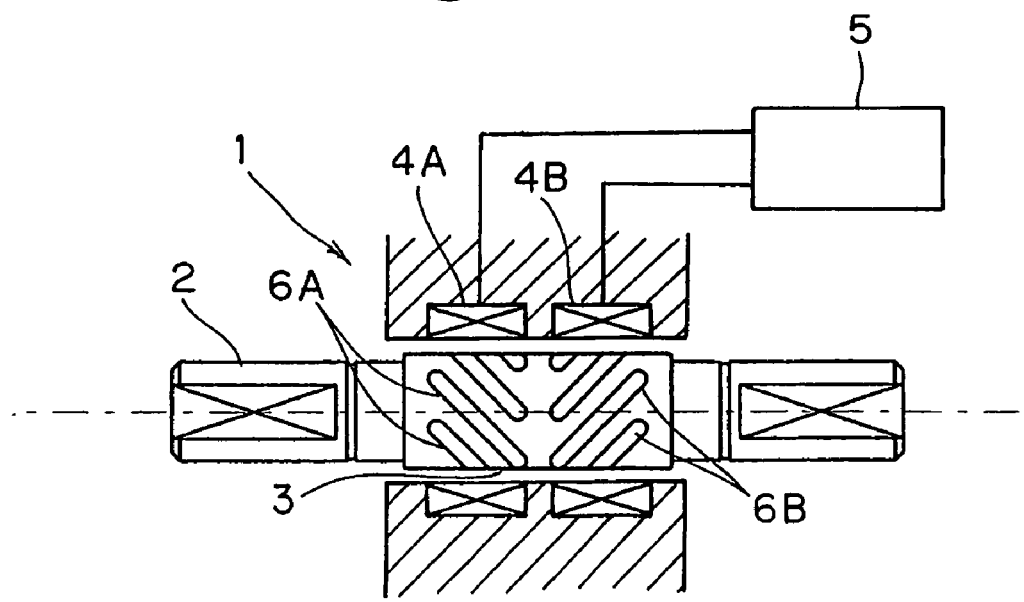
FIG. 4 is a schematic diagram showing the structure of a torque detecting device according to a third preferred embodiment of the present invention.
Figure 5:
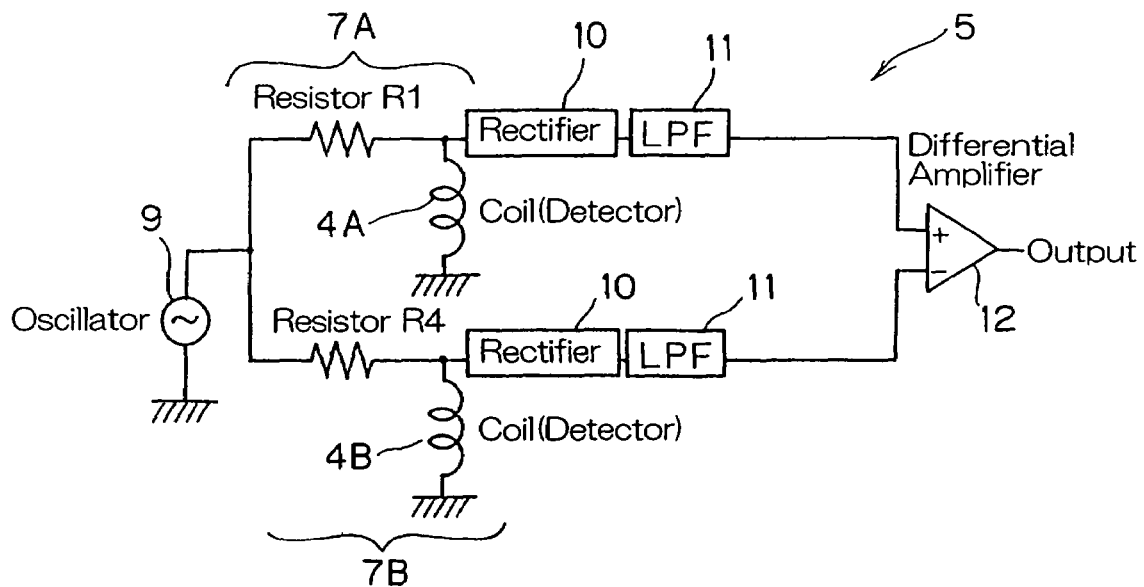
FIG. 5 is a block circuit diagram showing an electric circuit of a detection signal processing means employed in the torque detecting device shown in FIG. 4.

FIGS. 4 and 5 illustrate a third preferred embodiment of the present invention. The torque detecting device shown therein is substantially similar to that according to the first embodiment described with reference to FIG. 1, except that in this embodiment, the plural grooves 6 angled relative to the longitudinal axis of the torque transmitting shaft 2 are formed in two rows 6A and 6B in the target area subject to torque detection 3 while equidistantly spaced from each other in a circumferential direction of the latter, with the row of the grooves 6A inclined in a sense opposite to the row of the grooves 6B relative to the longitudinal axis of the torque transmitting shaft 2. In correspondence with the use of the two rows of the inclined grooves 6A and 6B, two detecting coils 4A and 4B are employed.

The detection signal processing means 5 utilizable in the practice of the third embodiment includes, as best shown in FIG. 5, a first series connected circuit 7A made up of a resistor R1 and the detecting coil 4A aligned with the row of the inclined grooves 6A, a second series connected circuit 7B made up of a resistor R4 and the detecting coil 4B aligned with the row of the inclined grooves 6B and connected parallel to the first series connected circuit 7A, and an oscillator 9 for applying an alternating current voltage to both of the first and second series connected circuits 7A and 7B. A divided voltage across the detecting coil 4A is, after having been converted by means of a rectifier 10 and a low pass filter 11 into a direct current voltage, supplied to a first input terminal of a differential amplifier 12. On the other hand, a divided voltage across the detecting coil 4B is also, after having been converted into a direct current voltage by another rectifier 10 and another low pass filter 11, supplied to a second input terminal of the differential amplifier 12 as a reference voltage. The differential amplifier 12 in turn outputs a signal indicative of the difference between the reference voltage from the second series connected circuit 7B and a voltage from the first series connected circuit 7A.

Other structural features of this embodiment are similar to those employed in the previously described first embodiment.

In the torque detecting device 1 according to the third embodiment, when the torque acts on the torque transmitting shaft 2 with a tensile stress acting on the first row of the grooves 6A of the target area subject to torque detection 3, a compressive stress acts on the second row of the grooves 6B. Accordingly, when the difference between detected values (changes in impedance) of the detecting coils 4A and 4B associated with the first and second rows of the grooves 6A and 6B is outputted as a detection signal, the direction and magnitude of a torsional torque acting on the torque transmitting shaft 2 can be determined in reference to the polarity (positive or negative) and magnitude of such output.

It is to be noted that in the third embodiment, in place of the first and second rows of the grooves 6A and 6B, two rows of diffusion layer formed islands 16 inclined relative to the longitudinal axis of the torque transmitting shaft 2, with one row of the diffusion layer formed islands being inclined in a sense opposite to the other row of the diffusion layer formed island, may be employed in a manner substantially similar to that described in connection with the first embodiment. Even in this case, the direction and magnitude of the torsion torque acting on the torque transmitting shaft 2 can be determined.

Figures 6A, 6B:
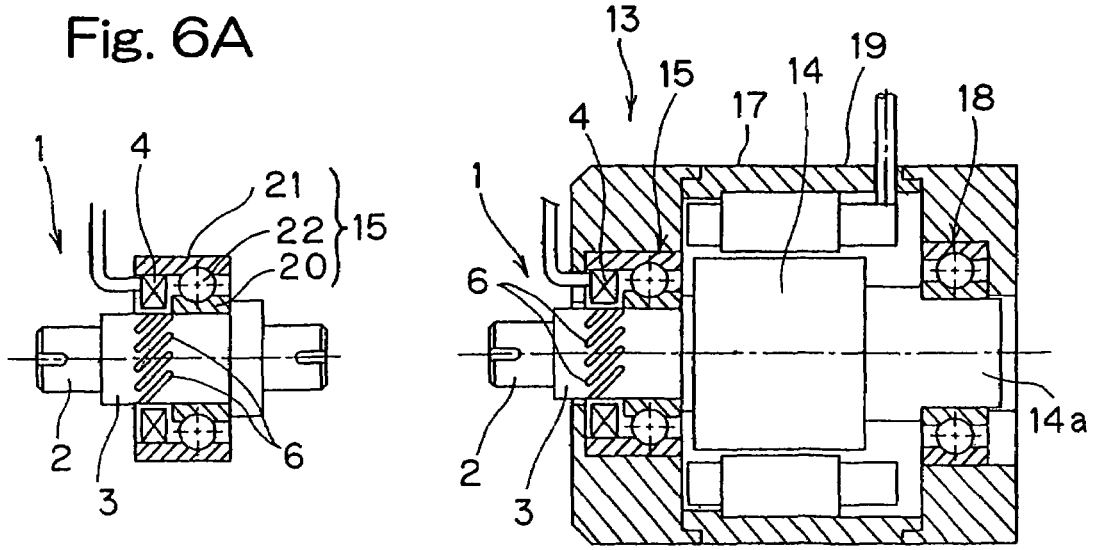
FIG. 6A is a sectional view of a torque detecting device according to a fourth preferred embodiment of the present invention.
FIG. 6B is a sectional view showing a motor having the torque detecting device shown in FIG. 6A incorporated therein.

FIG. 6 illustrates a fourth preferred embodiment of the present invention. The torque detecting device 1 according to this embodiment is such that the torque transmitting shaft 2 is utilized as a rotary shaft of a motor 13. FIG. 6A illustrates a sectional view of the torque transmitting shaft 2 thereof and FIG. 6B illustrates a sectional view of the torque transmitting shaft 2 incorporated in the motor 13. The torque transmitting shaft 2, which is the rotary shaft of the motor 13, is removably coupled with a rotor 14 of the motor 13. A rolling bearing 15 is mounted on the torque transmitting shaft 2 and, through this rolling bearing 15, the torque transmitting shaft 2 is rotatably supported by a front inner peripheral surface of a housing 17 of the motor 13. An axle portion 14a of the rotor 14 is rotatably supported by a rear inner peripheral surface of the housing 17 through a different rolling bearing 18. A stator 19 positioned radially outwardly of the rotor 14 is disposed in an intermediate inner peripheral surface of the housing 17.

The rolling bearing 15 supporting the torque transmitting shaft 2 includes an inner race 20 mounted on the torque transmitting shaft 2 at a location axially spaced away from the target area subject to torque detection 3, an outer race 21 mounted on the front inner peripheral surface of the housing 17, and a row of rolling elements in the form of balls 22 interposed between the inner race 20 and the outer race 21. The detecting coil 4 of the torque detecting device 1 is carried by an inner peripheral surface of the outer race 21 in face-to-face relation with the target area subject to torque detection 3.

The grooves 6 of the target area subject to torque detection 3 may, however, be replaced with the diffusion layer formed islands 16 such as shown and described in connection with the second embodiment with reference to FIG. 2.

Figure 7:
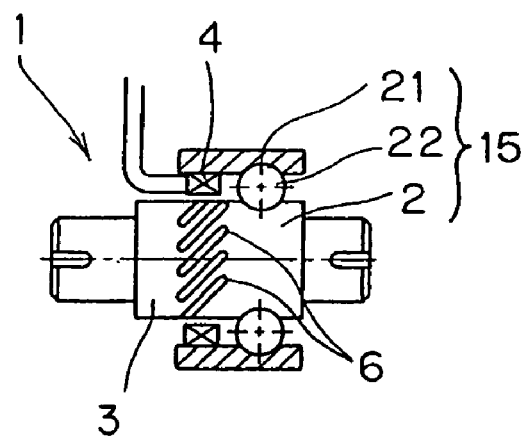
FIG. 7 is a sectional view of a torque detecting device according to a fifth preferred embodiment of the present invention.

It is to be noted that the inner race 20 of the rolling bearing 15 may be dispensed with and, instead, an outer periphery of the torque transmitting shaft 2 may be concurrently utilized as an inner race such as shown in FIG. 7 in connection with a fifth preferred embodiment of the present invention that follows.

Figure 8A:
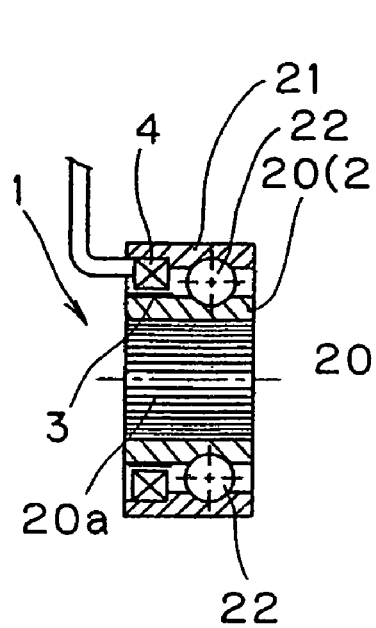
FIG. 8A is a sectional view of a torque detecting device according to a sixth preferred embodiment of the present invention.
Figure 8B:
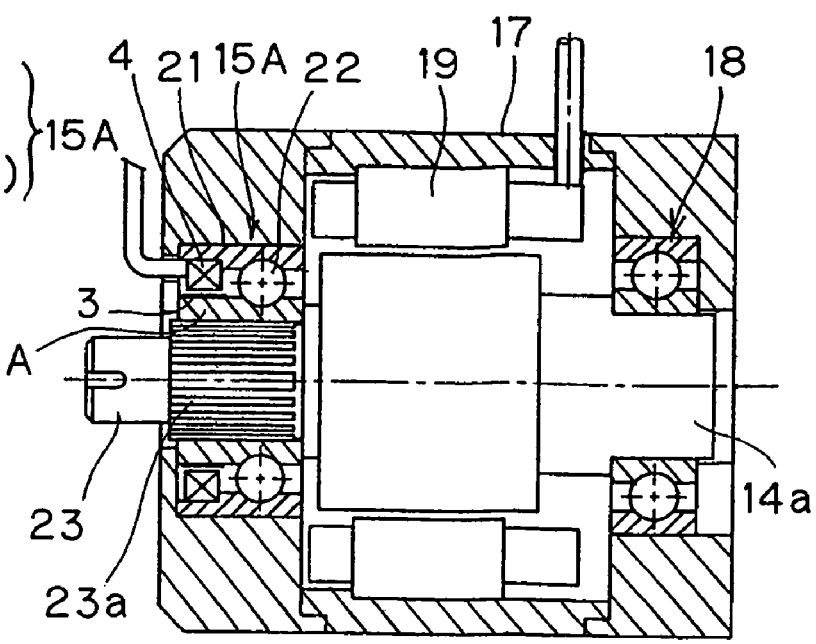
FIG. 8B is a sectional view showing a motor having the torque detecting device shown in FIG. 8A incorporated therein.

FIG. 8 illustrates a sixth preferred embodiment of the present invention. The torque detecting device 1 according to this embodiment is such that the torque transmitting shaft 2 shown and described in connection with the first embodiment is applied in an inner race 20A of a rolling bearing 15A used to rotatably support a rotary shaft 23 of the motor 13. FIG. 8A is a sectional view of the rolling bearing 15A and FIG. 8B is a sectional view showing the rolling bearing 15A incorporated in the motor 13. The rolling bearing 15A shown therein includes the inner race 20A, which serves as the torque transmitting shaft 2, an outer race 21 mounted on a front inner peripheral surface of the housing 17 of the motor 13, and a row of rolling elements in the form of balls 22 interposed between the inner race 20A and the outer race 21.

A surface region of the inner race 20A spaced axially away from a site defining a raceway for the balls 22 is rendered to be the target area subject to torque detection 3 where the Al diffusion layer is formed. This Al diffusion layer may alternatively be provided on the entire outer surface of the inner race 20A. In such case, the site defining the raceway for the balls 22 may be cut or ground, and that portion which is used as the target area subject to torque detection 3 and located next to the site defining the raceway may be provided with the inclined grooves 6 (FIG. 1) as is the case with any one of the foregoing embodiments.

The inner race 20A has an inner peripheral surface formed with axially extending and circumferentially regularly arranged indentations 20a. Those indentations 20a may be in the form of, for example, serrations. Those indentations 20a are engaged with indentations 23a formed on an outer peripheral surface of the motor rotary shaft 23 so as to extend axially thereof and be arranged circumferentially regularly, to thereby couple the inner race 20A and the motor rotary shaft 23 together. With this coupling, the torque of the motor rotary shaft 23 can be transmitted to the target area subject to torque detection 3. The detecting coil 4 of the torque detecting device 1 is disposed on an inner peripheral surface of the outer race 21 in face-to-face relation with the target area subject to torque detection 3 in the inner race 20A, which is the torque transmitting shaft 2. Other structural features of the motor 13 are similar to those shown and described in connection with the embodiment of FIG. 6.

By so constructing, the torque detecting device 1 can be compactly installed in the motor 13. Where as hereinbefore described, the indentations 20a such as, for example, serrations are formed in the inner race 20A, which forms the torque transmitting shaft 2, the Al diffusion to form the Al diffusion layer in the target area subject to torque detection 3 may be carried out either after the formation of the indentations 20a or prior to the formation of the indentations 20a. The magnetostrictive material comprised of the Al diffusion layer has an excellent processability and, therefore, after the formation of the Al diffusion layer, the indentations 20a such as the serrations referred to above can be formed. By coupling through those indentations 20a, a high coupling precision can be obtained and a high torque can easily be loaded with no rattling motion.

It is to be noted that, instead of the formation of the grooves 6, such diffusion layer formed islands 16 as employed in the embodiment of FIG. 2 may be employed in the target area subject to torque detection 3.

Figure 9:
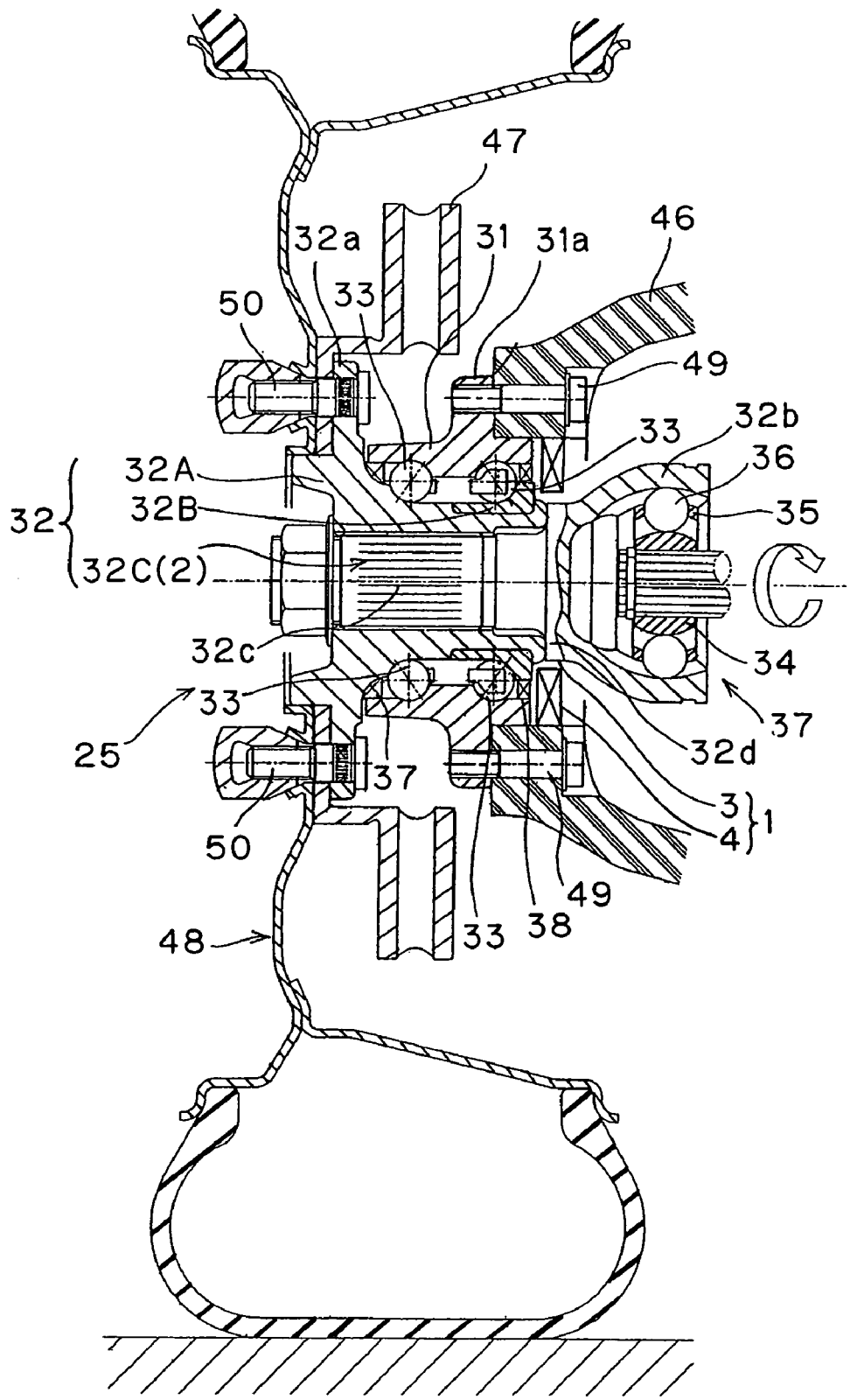
FIG. 9 is a sectional view of a drive wheel support mechanism having incorporated therein the torque detecting device according to a seventh preferred embodiment of the present invention.

FIG. 9 illustrates a seventh preferred embodiment of the present invention. The torque detecting device 1 shown therein is such that the torque transmitting shaft 2 referred to in connection with the first embodiment is applied to an shaft portion 32c of a component 32C which forms an outer race of a constant velocity ball joint 37 employed in a drive wheel support unit. The drive wheel support unit is equipped with a wheel support bearing assembly 25 of an inner race rotating type.

The wheel support bearing assembly 25 referred to above includes an outer member 31 having an inner periphery formed with a plurality of, for example, two, raceways defined therein, an inner member 32 having rolling faces defined therein in face-to-face relation with the respective raceways in the outer member 32, and two rows of rolling elements 33 interposed between the raceways in the outer member 31 and the raceways in the inner member 32. The outer member 31 serves as a stationary or non-rotatable member and is of one-piece construction including a vehicle body fitting flange 31a formed integrally therewith for securement to a knuckle 46. The vehicle body fitting flange 31a is fastened with the knuckle 46 rigid with a vehicle body structure (not shown), through a plurality of knuckle bolts 49. On the other hand, the inner member 32 serves as a rotatable member and includes a hub axle 32A having a wheel mounting flange 32a, a separate inner race forming segment 32B mounted externally on one end of the hub axle 32A, and a separate constant velocity ball joint forming component 32C inserted into a bore of the hub axle 32A. The raceways in the inner race 32 are in practice formed in the hub axle 32A and the inner race forming segment 32B, respectively.

The constant velocity ball joint 37 is made up of the constant velocity ball joint forming component 32C, which forms a part of the outer race referred to above, a joint inner race 34, and a row of rolling elements 36 interposed between the constant velocity ball joint forming component 32C and the joint inner race 34, and a roller retainer 35. The forming component 32C, which defines a joint outer race, is of one-piece construction including a cup portion 32b and the shaft portion 32c, with the shaft portion 32c inserted into and splined to an inner peripheral surface of the hub axle 32A. In other words, the inner peripheral surface of the hub axle 32A and the outer peripheral surface of the shaft portion 32c are formed with respective sets of indentations, i.e., splined grooves and splined projections, respectively.

The wheel mounting flange 32a is positioned on an outboard end of the inner member 32, and a wheel 48 is fixedly connected to the wheel mounting flange 32a through a brake rotor 47 by means of a plurality of fastening bolts 50. The inner race forming segment 32B is fixedly mounted on an inboard end of the hub axle 32A and is held in axially immovable fashion relative to the hub axle 32A by means of a crimped portion provided at the inboard end of the hub axle 32A. An annular bearing space delimited between the outer member 31 and the inner member 32 have its opposite outboard an inboard ends sealed by contact type sealing members 37 and 38, respectively.

The target area subject to torque detection 3 of the torque detecting device 1 is provided on a large diameter shaft portion 32d which is found at a base end of the outer race shaft portion 32c of the constant velocity ball joint forming component 32C. The Al diffusion layer, which forms the target area subject to torque detection 3, is provided in a surface region of this large diameter shaft portion 32d. This large diameter shaft portion 32d, where the Al diffusion layer is formed, is provided with either the plural inclined grooves 6 similar to those in the first embodiment or the diffusion layer formed islands 16 similar to those shown in FIG. 2. The detecting coil 4 confronting the target area subject to torque detection 3 is provided on the outer member 31.

As described in detail hereinabove, when the target area subject to torque detection 3, comprised of the Al diffusion layer referred to hereinbefore, is formed on the constant velocity ball joint forming component 32C in the drive wheel support structure, the torque of the drive shaft in the automotive vehicle can be measured. Accordingly, a fine and precise control of the automotive vehicle and an engine can be accomplished. It is, however, to be noted that the target area subject to torque detection 3 of the structure according to any one of the foregoing embodiments may be provided in the inner race 34, or an intermediate shaft (not shown) coupled with the inner race 34, which forms a part of the constant velocity ball joint 37. While the constant velocity ball joint 37 referred to above is used for transmitting a drive to the drive wheel, the present invention can be equally applied to a component part forming a part of the constant velocity ball joint employed in a power steering system or a shaft member coupled with the constant velocity ball joint, in which case a high-response steering characteristic can be obtained due to the highly precise torque detection.

What is claimed is:

1. A torque detecting device, which comprises a target area subject to torque detection provided in a surface region of a torque transmitting shaft made of a steel material; a detecting coil provided in a non-contact fashion in face-to-face relation to an outer periphery of the target area subject to torque detection; and a detection signal processing circuit, electrically coupled with the detecting coil, for detecting a change in magnetic permeability of the target area subject to torque detection to thereby detect a torque, wherein the target area subject to torque detection is constituted by an Al diffusion layer containing Al in a concentration gradually decreasing from a surface of the torque transmitting shaft in a direction radially inwardly of the latter.

2. The torque detecting device as claimed in claim 1, wherein the Al diffusion layer has a concentration of Al at a surface thereof within the range of 5 to 25 wt %, and having a depth of diffusion exceeding 0.1 mm.

3. The torque detecting device as claimed in claim 1, wherein a steel material having a matrix of a composition containing 0.15 to 0.6 wt % of C; 0.1 to 1.0 wt % of one or two or more elements selected from the group consisting of Si, Mn, Cr, Mo and Ni; and not greater than 0.02 wt % of S and P is used for the torque transmitting shaft.

4. The torque detecting device as claimed in claim 3, wherein the matrix of the torque transmitting shaft contains 0.01 to 0.15 wt % of Al, and 0.01 to 0.25 wt % of one or two or more elements selected from the group consisting of Nb, V, Ti and Zr.

5. The torque detecting device as claimed in claim 1, wherein the torque transmitting shaft has grooves defined in the target area subject to torque detection and the diffusion layer is formed subsequent to formation of the grooves.

6. The torque detecting device as claimed in claim 1, wherein the torque transmitting shaft includes axially extending and circumferentially regularly arranged indentations for connection with another component part and for transmitting the torque to the component part, the indentations being formed in the Al diffusion layer.

7. The torque detecting device as claimed in claim 1, wherein the torque transmitting shaft is hardened and tempered, or carburized, after the diffusion of Al.

8. The torque detecting device as claimed in claim 1, wherein the torque transmitting shaft is processed to have a residue stress in an outermost surface portion thereof, as a compressive stress, by means of hardened steel cutting, grinding or shot peening that is performed after the diffusion of Al.

9. The torque detecting device as claimed in claim 1, wherein nitrogen is diffused in the Al diffusion layer.

10. The torque detecting device as claimed in claim 1, wherein the torque transmitting shaft provided with the target area subject to torque detection is a shaft member of a constant velocity ball joint.

11. The torque detecting device as claimed in claim 1, wherein the torque transmitting shaft is formed with a plurality of grooves inclined relative to a longitudinal axis thereof and deployed in a direction circumferentially thereof and wherein the target area subject to torque detection comprised of the Al diffusion layer is provided within an axial range of the torque transmitting shaft, where the grooves are provided.

12. The torque detecting device as claimed in claim 1, wherein the Al diffusion layer comprises a plurality of diffusion layer formed islands being inclined relative to a longitudinal axis of the torque transmitting shaft and deployed in a direction circumferentially thereof, and wherein an axial range of the torque transmitting shaft, where the diffusion layer formed islands are provided, defines the target area subject to torque detection.

13. The torque detecting device as claimed in claim 11, wherein the torque transmitting shaft comprises a shaft portion of a constant velocity ball joint.

14. The torque detecting device as claimed in claim 12, wherein the torque transmitting shaft comprises a shaft portion of a constant velocity ball joint.

15. The torque detecting device as claimed in claim 11, wherein the torque transmitting shaft comprises a raceway member of a rolling bearing assembly.

16. The torque detecting device as claimed in claim 12, wherein the torque transmitting shaft comprises a raceway member of a rolling bearing assembly.

* * * * *